May 3, 1966  F. HARTMANN  3,248,855
PROCESS FOR SEPARATING CARBON DIOXIDE FROM A GAS MIXTURE
Filed Sept. 6, 1963
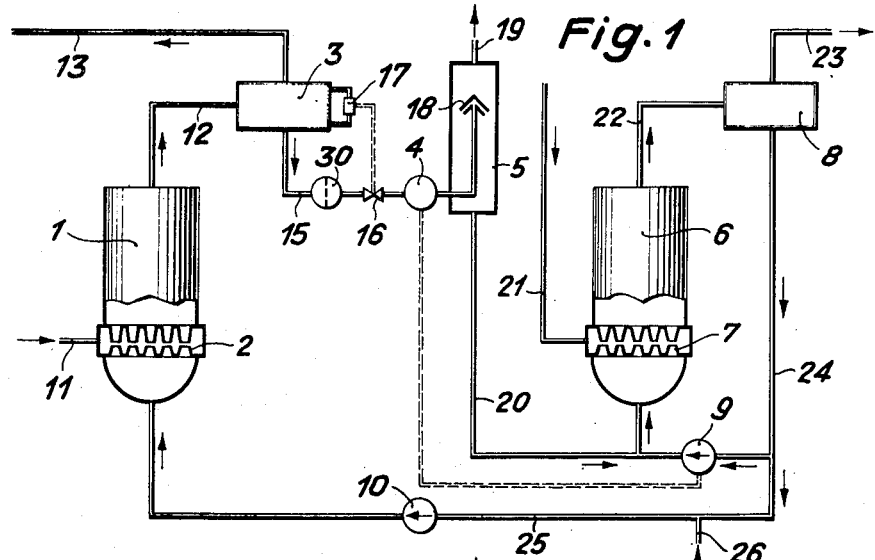
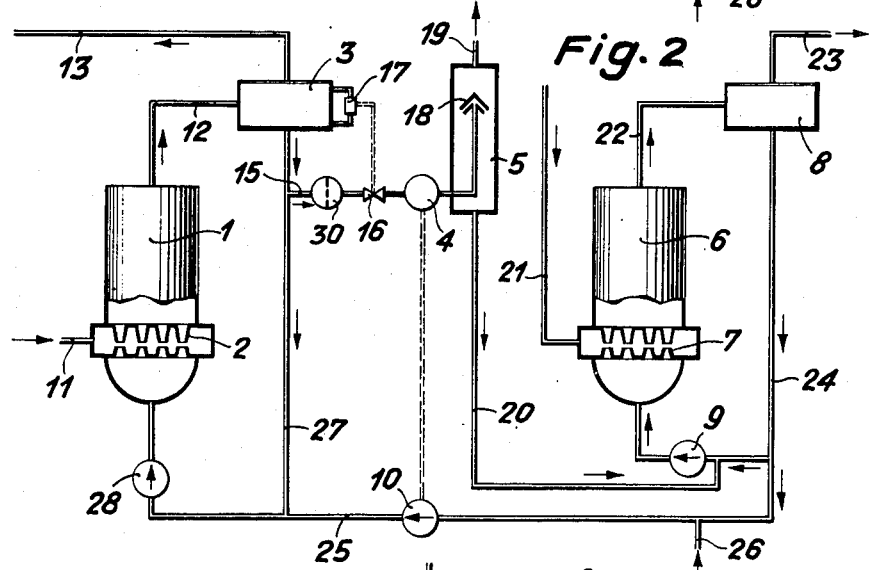
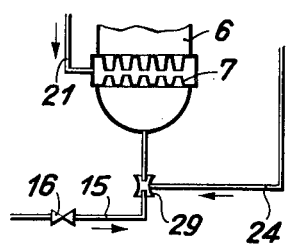
Inventor:
FORTUNAT HARTMANN
By
Pennie Edmonds Morton Taylor & Adams
Attorneys

United States Patent Office 3,248,855
Patented May 3, 1966

3,248,855
PROCESS FOR SEPARATING CARBON DIOXIDE
FROM A GAS MIXTURE
Fortunat Hartmann, Zurich, Switzerland, assignor to Sulzer Brothers Limited, Winterthur, Switzerland, a company of Switzerland
Filed Sept. 6, 1963, Ser. No. 307,178
Claims priority, application Switzerland, Sept. 11, 1962, 10,779/62
3 Claims. (Cl. 55—44)

This invention relates to a process for separating carbon dioxide out of a mixture of gases with the help of an absorptive material which circulates in a closed path. According to the process of the invention, after absorption of the carbon dioxide by the absorption medium and after a subsequent separation of the absorption medium from the gas mixture, the carbon dioxide is stripped out of the absorption medium with the help of a gas (hereinafter referred to as the stripping gas) and thereupon the absorption medium is again brought into contact with the gas mixture for further absorption of carbon dioxide.

According to the invention, the volume of the absorption medium brought per unit time into contact with the mixture of gases from which $CO_2$ is to be separated and into contact with the stripping gas is selected to be large enough so that, not only is there formed a liquid column pierced by gas jets in each of the absorption and stripping devices (wherein respectively a vortical mixing of the absorption medium with the gas mixture and with the stripping gas is achieved by means of nozzles), but additionally there is maintained throughout the whole loop path of the absorption medium substantially the same elevated temperature by reference to the ambient temperature, this increased temperature being representative primarily of the pumping energy delivered by the pumps in this loop path.

By contrast with known processes, that of the invention permits the attainment of substantially lower energy requirements. Likewise, the amount and cost of the apparatus required for practice of the present invention is small by comparison with that required in known processes. In the operation of absorption and separating or stripping towers provided with specially constructed mixing nozzles, it is essential, in order to maximize the transfer of carbon dioxide out of a gas mixture into the liquid absorption medium, to provide a liquid column traversed by gas jets. Otherwise stated, it is essential to obtain a dispersion of the gas in the liquid. A suitable magnitude for the amount of absorption medium passing through the absorption and stripping devices is given by the criterion that the volume of the absorption medium which is brought into contact with the gas mixture in unit time should be at least one sixth of the effective volume of the gas mixture. Equivalently, the volume of the absorption medium brought per unit time into contact with the stripping gas should be at least one sixth the effective volume of the stripping gas. By "effective volume" of the gas mixture here is meant the actual volume of the gas mixture containing $CO_2$ passing into the absorption tower in unit time, for example one hour, at the pressure prevailing in the absorption phase of the process. Equivalently, the "effective volume" of the stripping gas here means the actual volume of stripping gas passing into the stripping tower in unit time, such as one hour, at the pressure prevailing in the stripping phase of the process. The invention can be applied with particular advantage over a range of pressures, in the absorption phase, ranging from about 1 to 50 atmospheres. It has hitherto been desired to avoid the circulation of so large a quantity of absorptive medium in view of the large amount of driving energy necessary to the pumps for circulation of the absorption medium, and additionally because cooling devices of large dimensions were necessary in order to dissipate the accompanying temperature rises so that the absorption might take place at temperatures lower than those prevailing in the stripping phase.

In contrast, the present invention departs from a recognition of the fact that substantial advantages may be enjoyed by carrying out the absorption phase of the process at the same temperature as the stripping phase. The stripping of the absorption medium from the $CO_2$ is to be carried out with the air of fresh air or of an inert gas as a stripping medium in a stripping device similar, as regards the mixing nozzles employed, to that employed for absorption. It is particularly advantageous to practice the invention with the absorption phase carried out at high pressure, for example ten atmospheres, whereas the stripping process is carried out at substantially atmospheric pressure. In the practice of the invention, there prevails throughout the closed loop path over which the absorption medium circulates approximately the same elevated temperature, which may be, for example, from 30° C. to 75° C., and which is above the ambient or surrounding temperature. This is in consequence of the circulation of a quantity of absorption medium large by comparison with that employed in prior art processes and in view of the consequent large energy requirements for effecting circulation of the absorption medium. In this connection the invention dispenses intentionally with the production of a lower temperature for the absorption phase of the process since the influence of temperature on absorption is low at high pressures and since moreover, with the increased temperature available in accordance with the invention without the supply of supplementary heat, a highly effective stripping is achieved at atmospheric pressure. The total result is a substantially reduced energy consumption of the installation by comparison with known systems in which heating and cooling devices must be provided in the closed loop path of the absorption medium.

The invention will now be further described with reference to the accompanying drawings in which:

FIGURE 1 is a diagrammatic illustration of one form apparatus suitable for practice of the invention, including one absorption tower and one stripping tower;

FIGURE 2 illustrates a modification of the system of FIGURE 1 in which one portion of the $CO_2$-bearing absorption medium is continuously returned to the absorption tower; and FIGURE 3 illustrates a modification of a portion of the systems of FIGURES 1 and 2.

Referring to FIGURE 1, the apparatus for absorption of $CO_2$ out of a gas mixture and for regeneration of the charged absorption medium by means of fresh air comprises essentially an absorption tower 1 in the lower portion of which there is provided a double floor having mixing nozzles 2 therein, these being optionally of known type. The apparatus further includes a liquid separator 3 for separation of the $CO_2$-free gas mixture from the absorption medium, now laden with $CO_2$. It further includes a filter 30 for the separation of solid impurities, an expansion machine 4 such as a turbine, and a degasifier 5 for the separation of valuable gases taken up by the absorption medium during the absorption phase of the process. It further includes a stripping tower 6, which may be of the same construction as the absorption tower 1, the tower 6 having a double floor 7 equipped with nozzles, similar to the double floor in the tower 1. There is provided a liquid separator 8 for the separation of $CO_2$-charged fresh air from the regenerated absorption medium. There is also provided a circulating pump 9 for recirculation of absorption medium into the stripping tower and a pump 10 for supplying the absorption medium from the stripping to the absorption part of the system and for raising the pressure of that medium from the level prevailing on stripping to the level desired for the absorption phase.

The operation of the process of the invention in the system of FIGURE 1 is as follows:

A mixture of gases from which at least most of the $CO_2$ is to be separated by washing and which is available under a pressure of some ten atmospheres is drawn or aspirated out of a line 11 into the tower 1 by operation of the nozzles 2, through which the absorption medium is streaming. In case the gas mixture is not initially available at this high pressure, it may be brought thereto by means of a gas blowing or other compressor device not shown, connected to the left end of the line 11. The gas mixture thus drawn into the tower 1 is there thoroughly mixed or contracted by vortex flow with the absorption medium. By reason of the ratio of the quantity of absorption medium passing through the tower per unit time to the effective through-put volume of the gas mixture, which according to the invention is at least one-sixth, there is built up in the tower of a column of liquid traversed by gas jets in which the $CO_2$ will, at least to a large extent, be absorbed by the liquid absorption medium out of the gas mixture. The mixture of liquid and gas then flows under a pressure of some ten atmospheres through the line 12 into the separator 3, constituting a first separating stage, from whose upper portion the purified gas mixture (i.e. freed from $CO_2$) passes through a line 13 for further processing or use.

The absorption medium now charged with $CO_2$ passes out of the lower end of the separator through line 15 in which a valve 16 is provided for control of the quantity of liquid drawn off. This valve may be controlled in known fashion by means of a level regulating device 17. The thus charged absorption medium is reduced in pressure to some one and a half atmospheres in the expansion turbine 4 and is delivered to the degasifier 5 for recovery of valuable gases which may have been taken up by the absorption medium from the initial gas mixture during the absorption phase. There may be employed an expansion valve in place of the turbine 4. In the exemplary embodiment of FIGURE 1, this degasifier 5 includes a shrouded nozzle 18 in which there occurs a further expansion of the absorption medium down to approximately 0.5 atmosphere. The gases separated off in the degasifier are withdrawn therefrom at a line 19 and may after appropriate compression be returned to the purified gas mixture at line 13. The absorption medium charged with $CO_2$ is withdrawn from the degasifier at line 20 and is introduced into the stripping tower 6 where it effects aspiration of fresh air from the atmosphere through line 21, by means of nozzles 7. If the stripping is to be carried out at higher pressure, a compressing device may be included in the line 21. There occurs an intensive mixing or contacting of the liquid absorption medium with the fresh air in the nozzles 7 of tower 6 and also in the rising channels above them, in the course of which there will occur in known fashion a separation of the $CO_2$ out of the absorption medium and onto the fresh air. The mixture of liquid and gases emerges from the tower 6 at line 22 and flows into the separator 8, constituting a second separating stage, out of which the fresh air charged with $CO_2$ passes at line 23 into the atmosphere whereas the regenerated absorption medium is drawn through line 24 by circulating pump 9, which raises its pressure to some 0.5 atmosphere. Part of the absorption medium so regenerated may be returned to the tower 6 where as the remainder passes through line 25 by means of the pump 10, which raises it to the necessary absorption medium operating pressure of 11 atmospheres in the example under consideration, and whence it is delivered to the lower portion of the absorption tower 1.

For the absorption medium employed to separate out $CO_2$ there may be employed the usual solvent media such as basic solutions, for example of carbonates, of pure water, or organic solutions such as ethanolamine. Water vaporized out of the absorption medium may be replaced by distilled water or steam introduced at a line 26.

As is schematically indicated in the drawing by means of the dashed line conduit between the turbine 4 and the pump 9, the energy liberated in the expansion occurring in the turbine may advantageously be employed to drive one of the circulating pumps. In this case the turbine 4 and the pump 9 may be mounted on a common shaft.

The raised temperature level in the cyclical path results from the transformation into heat of the energy delivered to the circulating pumps and also as a result of transformation of the excess pressure of the absorption medium occurring in the nozzles 2 and 7 of the towers 1 and 6, where the pressure of the absorption medium declines to that prevailing at the upper ends of these towers. That is to say, there occurs initially a transformation of the potential energy of the absorption medium into kinetic energy at the nozzles, this kinetic energy being transformed into the energy of rotation in the whirling gases and then into heat. In view of the loss of heat from the absorption medium to the stripping gas which occurs in the stripping tower and due to the similar loss of heat from the absorption medium to the gas mixture which is withdrawn from the absorption tower (in the event that the gas mixture enters the tower at a lower temperature such as the ambient temperature), and in view further of the losses of the whole system to the surroundings (due primarily to convection), there will quickly be achieved throughout the whole closed loop path a substantially uniform temperature, above that of the surroundings.

The embodiment illustrated in FIG. 2 corresponds to that of FIG. 1 except that a portion of the absorption medium withdrawn from the separator 3 is returned directly via line 27 into the absorption tower with the aid of a circulating pump 28. Further in this embodiment, the expansion turbine 4 is mechanically coupled to the pump 10 and to an electric drive motor not shown.

In this embodiment the absorption medium may be expanded down to a pressure of approximately one atmosphere in the degasifier 5 and fed into the line 24 upstream of the pump 9.

The numerical values hereinabove mentioned in conjunction with the embodiments described are exemplary only. Thus, it may be desirable to raise the pressure of the absorption medium in the pump 10 to a pressure higher than 11 atmospheres, such as for example 13 atmospheres, in the case of a pressure for the gas mixture of 10 atmospheres. In that event, it may be desirable to raise the pressure of the regenerated absorption medium at pump 9 not only to one-half atmosphere but to some two atmospheres.

If no degasifier 5 is necessary, it is advantageous to introduce an ejector 29 into the circuit, as shown in FIG. 3, instead of recovering the potential energy of the pressurized charged absorption material in an expansion turbine. In this case the circulating pump 9 will not be necessary.

In the event that the reduction in $CO_2$ concentration in the gas mixture is to be pressed further, plural installations as illustrated in the drawings can be connected one after the other.

In the separation of $CO_2$ from a mixture of gases by means of an absorption medium flowing in a closed loop path therefor, the invention provides a process comprising the steps of mixing the mixture with the absorption medium at a first portion or station of the path to form a liquid column of the absorption medium traversed by jets of the gases and thereby to effect absorption of $CO_2$ from the gas mixture by that medium, thereafter separating the mixture from the medium, thereafter mixing the medium at a second portion or station of the path with a washing or stripping gas to form a liquid column of the medium traversed by jets of that gas and thereby to wash or strip the $CO_2$ out of the medium and onto the stripping gas, thereafter separating the stripping gas from the absorption medium, and pumping the medium about that path at such a rate that the pumping energy maintains substantially throughout the path a temperature above ambient.

Preferably moreover one or both of the rates at which the gas mixture and stripping gas are introduced into the path for mixing with the absorption medium are adjusted by reference to the rate at which the absorption medium is pumped about the closed loop path so that the quantity of the mixture so mixed per unit time with the absorption medium, or the quantity of the stripping gas so mixed per unit time with the absorption medium, or both, occupy at their respective points of mixing with the absorption medium no more than six times the volume there occupied by the quantity of absorption medium which passes those points respectively in unit time. Alternatively stated, the absorption medium is preferably pumped about the closed loop path at such a rate that the quantity of that medium which in unit time flows past the absorption and stripping portions or stations of the path occupies at one or both of those stations a volume at least one-sixth of the volume there occupied by the quantities of gas mixture and stripping gas which pass those stations respectively in unit time.

While the invention has been described in terms of the presently preferred practice thereof, it will be understood that the invention is not limited thereto and that numerous variations on and departures from the particular procedures hereinabove described are possible within the spirit and scope of the invention as defined in the following claims.

I claim:
1. A process of removing $CO_2$ from a mixture of $CO_2$-containing gases by means of a liquid absorption medium which is selective for the $CO_2$ and which flows in a closed loop path, said process comprising:
   (a) aspirating the gas mixture upwardly in cocurrent flow through an upwardly flowing column of the liquid absorption medium at a first contacting stage in said path under a super-atmospheric pressure to absorb $CO_2$,
   (b) passing the gas mixture and the liquid of the column in cocurrent flow to a first separation stage in said path to separate gas from liquid,
   (c) separating a gas of reduced $CO_2$ content and the $CO_2$-containing liquid medium from one another at said first separation stage,
   (d) withdrawing the separated gas from said path,
   (e) aspirating a stripping gas selected from the group consisting of air and an inert gas upwardly in cocurrent flow through an upwardly flowing column of the $CO_2$-containing liquid medium after the step (c) separation at a second contacting stage in said path under a lower pressure than that at said first contacting stage to strip $CO_2$ gas from the $CO_2$-containing liquid medium,
   (f) passing the resulting $CO_2$-containing stripping gas and liquid medium of reduced $CO_2$ content in cocurrent flow to a second separating stage in said path to separate the gas from the liquid medium,
   (g) separating gaseous from liquid components at said second separating stage,
   (h) withdrawing the $CO_2$-containing stripping gas from said path, and
   (i) pumping the regenerated liquid medium separated at said second separating stage back to said first contacting stage as the absorbent therein at such a rate that the pumping energy maintains the temperature of the liquid medium above ambient temperature substantially throughout said closed path.

2. A process according to claim 1 wherein the volume of said liquid absorption medium passing said first contacting stage in unit time is at least one-sixth the volume, at said first contacting stage, of the gas mixture passing through said first contacting stage in unit time, and wherein the volume of said liquid medium passing said second contacting stage in unit time is at least one-sixth the volume, at said second contacting stage, of the stripping gas passing said second contacting stage in unit time.

3. The process according to claim 1 in which said temperature of the liquid medium is substantially between 30° C. and 75° C.

References Cited by the Examiner
UNITED STATES PATENTS

| | | | |
|---|---|---|---|
| 2,127,571 | 8/1938 | Pardee | 55—71 |
| 2,201,870 | 5/1940 | Piercy et al. | 55—42 |
| 2,522,005 | 9/1950 | Whitlock et al. | 55—41 |
| 2,649,166 | 8/1953 | Porter et al. | 55—44 |
| 2,808,125 | 10/1957 | Buck et al. | 55—68 |
| 2,863,527 | 11/1958 | Herbert et al. | 55—73 |
| 3,091,098 | 5/1963 | Bowers | 55—50 |
| 3,129,076 | 4/1964 | De Smet | 55—54 |
| 3,132,012 | 5/1964 | Walker | 55—48 |

OTHER REFERENCES

Gaylord et al.: The Falling Film Hydrochloric Acid Absorber, in Chemical Engineering Progress 53 (3), pages 139M–144M, March 1957.

REUBEN FRIEDMAN, *Primary Examiner.*

B. NOZICK, *Assistant Examiner.*